Feb. 11, 1936.  J. L. HOLMAN ET AL  2,030,590
HAULAGE APPARATUS FOR OPERATING SOIL SCRAPERS,
PLOWS, REAPING MACHINES AND THE LIKE
Filed Aug. 10, 1933  2 Sheets-Sheet 2

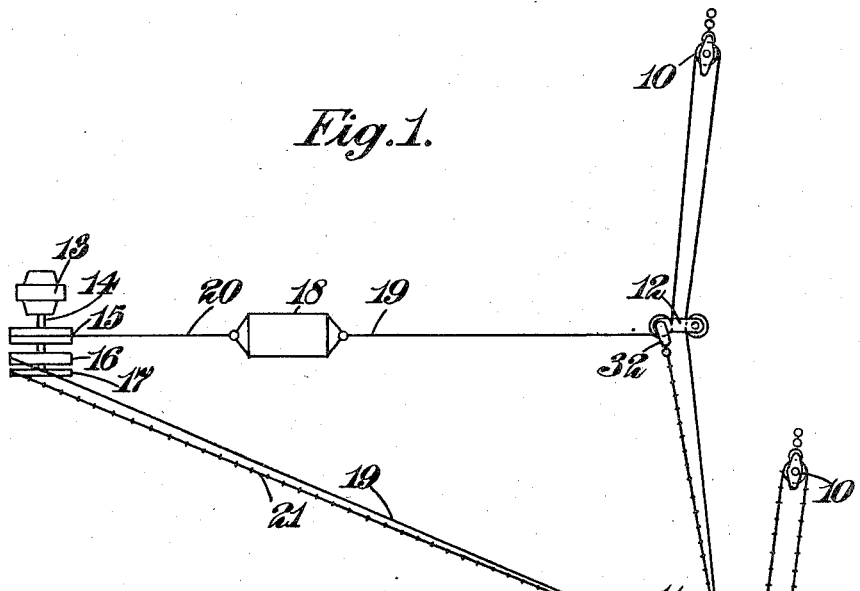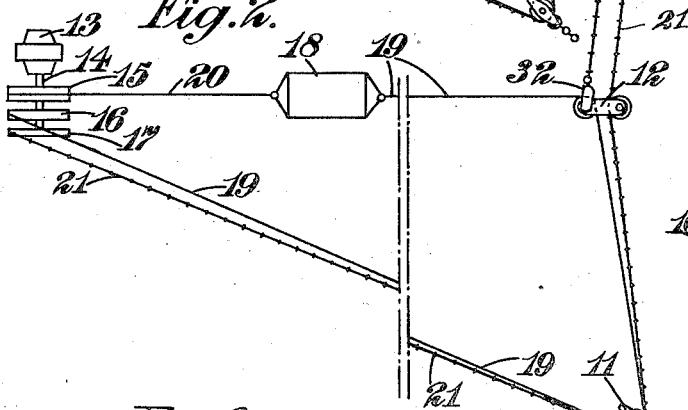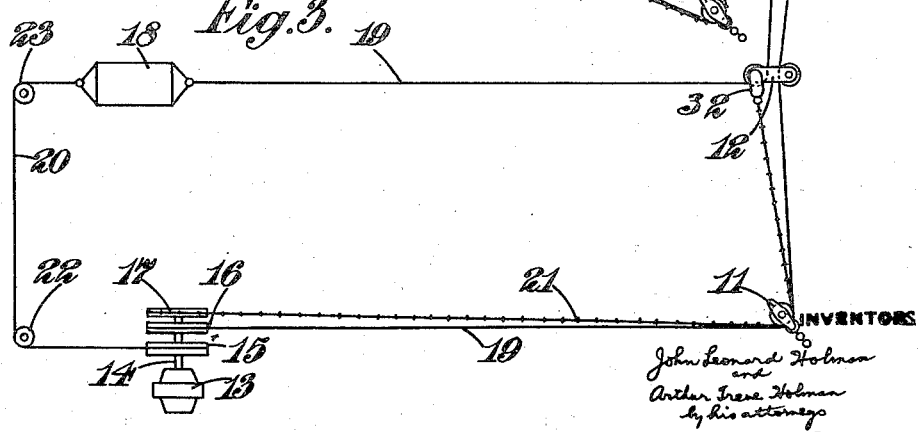

INVENTORS

Patented Feb. 11, 1936

2,030,590

UNITED STATES PATENT OFFICE 2,030,590

HAULAGE APPARATUS FOR OPERATING SOIL SCRAPERS, PLOWS, REAPING MACHINES AND THE LIKE

John Leonard Holman, Carbis Bay, Cornwall, and Arthur Treve Holman, Callestick, Cornwall, England, assignors to Holman Brothers Limited, Camborne, Cornwall, England, a British company Application August 10, 1933, Serial No. 684,556
In Great Britain August 29, 1932

10 Claims. (Cl. 37—115)

This invention consists in improvements in or relating to apparatus for operating soil scrapers, plows, reaping machines, harrows and the like and includes broadly apparatus for mining or agricultural purposes an element of which is to be drawn backwards and forwards over a given area to clear or treat either the whole area or so as to clear or treat that area to converge to a given point or to diverge from a given point.

An object of the present invention is to improve and in the main to simplify mechanism of this type as compared with similar mechanism heretofore devised.

For brevity the following expressions, which will be used throughout the specification and appended claims, are to be understood to have the meanings defined below.

"Scraper haulage mechanism" will be used to denote broadly all such mechanisms by which the area under consideration is to be treated.

"Soil scraper" or "scraper" will be used to refer to any tool, such as a plow, reaper, harrow or the like by which the surface of the ground can be treated for agricultural purposes or to a tool for scraping soil, sand, rocks and the like either above ground or under ground as in mines.

"Tail block" will be employed to denote a guide pulley block which is fixed and is not intended to be adjustable during the operation of the mechanism. Such a block will generally be anchored to the ground or to a member fixed therein or thereon in contradistinction to an "adjustable block" or "adjustable bridle" or "bridle" which denotes a single or multiple pulley block which may at any desired time be adjusted in its position with relation to the treated area but which may, nevertheless, remain or be held stationary in a given position for any desired length of time.

According to the present invention, scraper haulage mechanism comprises in combination a winding device (e. g. a manually- or power-operated drum or drums) with scraper haulage ropes passing therefrom for connection to opposite sides of a scraper, two tail blocks spaced apart on at least one side of the area to be treated with an adjustable block situated between them and capable of adjustment in a direction transverse to that of scraping, one at least of said scraper haulage ropes leading from the adjustable block to the scraper.

In a modification of the invention a similar arrangement of tail blocks and adjustable blocks can be employed on two opposite sides of the area to be treated both of which sides extend transversely to the direction of scraping.

Preferably, the adjustable blocks or each of them has means for mechanically adjusting it, such means comprising for instance a component (i. e. one of the drums) of the winding device.

It will be observed that the present invention necessitates, in its broadest aspect, only a single adjustable block. Preferably, the rope for adjusting the position of the latter is power-actuated by a component of a winding device but it may alternatively be manually operated if preferred.

In order that the invention may be more clearly understood some preferred examples will now be described with the aid of the accompanying four figures of drawings, each of which represents a different scraper-haulage system coming within the scope of the invention, and in each of which, like reference numerals are employed to denote like parts.

Figure 1 represents an arrangement for treating a triangular area with the winding means located at one corner of the said area.

Figure 2 represents an arrangement similar to that of Figure 1, but having an alternative disposition of certain haulage and adjustment ropes.

Figure 4:
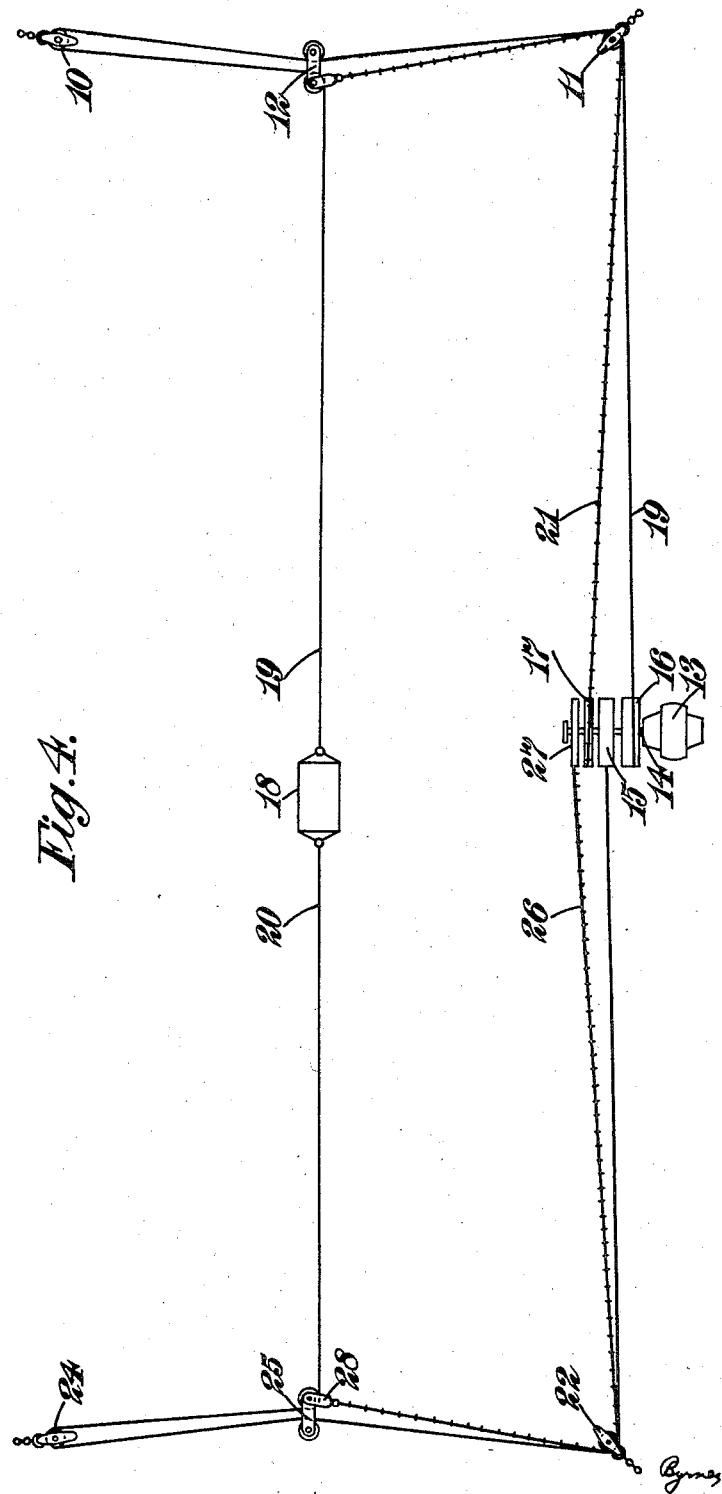

Figure 3 represents an arrangement provided with certain fixed pulleys in addition to the parts shown in Figure 1 thereby enabling the winding means to be located at an intermediate position along one side of the area to be treated; and Figure 4 represents an arrangement having a pair of adjustable blocks between which the soil scraper operates, located for adjustment along each of two opposite sides of the area to be treated.

Referring first of all to Figure 1, two tail blocks 10 and 11 are anchored respectively at two remote ends of one side of the area to be treated. The tail block 11 comprises two pulleys carried on a housing or bracket common to both. An adjustable block in the form of a two-pulley bridle 12 is situated between tail blocks 10 and 11 and a winding device is placed on the opposite side of the area to be treated. The winding device consists of a motor 13, a power-shaft 14 and winding drums 15, 16 and 17. It is to be understood that each of the drums is fitted with clutch mechanism by which it can be clutched at will to the driving shaft to be power driven at will.

The scraper is illustrated at 18 and it will be seen that one of the scraper haulage ropes 19 passes from the drum 16 over one of the pulleys on the tail block 11 then over one of the pulleys in the adjustable block 12 to the tail block 10 and finally from that block over the other pulley in the adjustable block 12 to one side of the scraper. The other haulage rope 20 passes direct from the other side of the scraper to the drum 15. A third rope 21 passes from the third winding drum 17 over the other pulley in the tail block 11 to a stirrup 32 secured to the bridle or frame of the adjustable block 12.

In operation the drums 15 and 16 can be controlled in known manner to haul the scraper backwards and forwards. The drum 17 can also be controlled to adjust the position of the adjustable block 12 substantially along a line extending between the tail blocks 10 and 11. Consequently by control of the three winding drums the area from a base line extending between the tail blocks 10 and 11 can be scraped or treated to converge at a position corresponding with or near to that of the haulage or winding mechanism.

The position of the winding mechanism may from time to time be altered so as to modify or change the area to be treated, but in all cases it will be seen that the pull from the winding drum of one side of the scraper is a direct pull from the drum 15.

In a modification of the invention as illustrated in Figure 2 the standing rope 21 passes from the drum 17 over pulleys in both tail blocks 10 and 11 and in engagement with one of the pulleys in the adjustable bridle 12 and from the block 10 it passes down to the stirrup 32. On the other hand the rope 19 passes from the winding drum 16 over another pulley in the tail block 11 then over the other one of the pulleys in the bridle 12 and thence directly to one side of the scraper 18. The rope 20 passes direct from the opposite side of the scraper to the drum 15 as before.

A further modification of the invention is illustrated in Figure 3 in which the position of the winding mechanism is changed and is now situated on a side of the area to be treated that is at right angles to the side represented by a line parallel to that joining the tail blocks 10 and 11. This arrangement necessitates a third tail block 22 and preferably a fourth block 23 which is intended to be anchored temporarily and adjustable from time to time in accordance with the shape of the area that is to be treated by the scraper 18. The ropes 19, 20 and 21 lead from the pulleys 15, 16 and 17 exactly as in the case of the form illustrated in Figure 1 except that the rope 20 passes over the tail block 22 and the block 23. This arrangement permits of any desired area being treated, either triangular or rectangular by adjustment of the position of the block 23.

A fourth example of the invention is shown in Figure 4, and this is an extension of the system illustrated in Figure 3. In addition to the anchored tail blocks 10, 11 and 22 of Figure 3 there is a fourth anchored tail block 24 so that there is now one tail block at each of the four corners of a rectangular area. The tail block 22 is a two pulley block similar to tail block 11 to accommodate standing and haulage ropes referred to below. There are, however, two adjustable bridles 12 and 25 respectively on opposite sides of the area and it will be seen that the arrangement of ropes on the right-hand side of the scraper and winding mechanism of Figure 3 is now duplicated on the opposite side. This necessitates four winding drums, two for the standing ropes and two for the running ropes. Although the relative positions of the winding drums are now somewhat altered the same reference numerals will be employed so far as is possible. Thus, from the winding drum 16 a rope 19 passes as before over the tail blocks 10 and 11 and the bridle 12 to one side of the scraper 18. The rope 20 from the other side of the scraper leads back to winding drum 15 but in so doing it passes over tail blocks 22 and 24 and bridle 25 similarly to the passage of the rope 19 over its tail blocks and bridle. The standing rope 21 extends from winding drum 17 over tail block 11 to bridle 12, and a similar standing rope 26 will now pass from a fourth winding drum 27 over tail block 22 to a stirrup 28 secured to the frame of the bridle 25.

By control of the winding drums 15, 16, 17 and 27 the scraper can be traversed backwards and forwards across the area and at the same time the positions of the bridles 12 and 25 can be adjusted in order that the scraper can be caused to traverse any portion or substantially the whole of the rectangular area bounded by the tail blocks 10, 11, 22 and 24, allowance being made, of course, as with similar mechanism hitherto, for the impossibility of traversing the scraper 18 to the extreme limits of the area due to the yield of the standing and haulage ropes.

If the scraper is taken to be representative of a plow the latter may have several, for instance, two or more, plowshares and the positions of the bridles 12 and 25 will be changed after each plowing traverse a distance equal to the width of the furrows plowed during the previous traverse. The plow is to be understood to be of the reversible type.

When the scraper 18 is a scraper suitable for mine mucking and the like it will be seen that in the form of the invention illustrated in Figures 1 and 2 the pull on the scraper, when the latter is full, is direct from one of the winding drums and this is considered to be of great advantage. Even in the form illustrated in Figure 3, the pull is more or less direct because during the actual scraping operation the pulleys 22 and 23 are both fixed pulleys permitting substantially no yield. This is not, however, the case in the form illustrated in Figure 4 because the pull on both sides of the scraper is taken over the adjustable bridle 12 or 25.

Although it is convenient to employ power-driven winding drums in all cases it is to be understood that any or all of them may be manually-actuated drums. In practice the manually-operated drums will generally be limited to those for actuating the standing ropes whereby the position of the adjustable block is controlled.

The invention is subject to many modifications in the arrangement of the several parts. For instance, it will be seen that the dispositions of the standing rope and of the running rope passing to the right-hand side of the scraper 18 are similar to that illustrated in Figure 1; but as a further example of the invention the standing and running ropes may be relatively arranged as in Figure 2. Moreover, in the examples illustrated in Figures 3 and 4 the winding mechanism is shown as situated intermediate the extremities of one side of the area to be treated. It may, however, be situated to one side of one of those extremities, in other words, to one side of the area to be treated, the run of the ropes being guided and modified in a manner well understood. Thus, the winding mechanism may be said to be in line with one of the sides of the area to be treated whether it is in the position just described or in the position illustrated in Figure 3 or in Figure 4.

As a further modification the relative arrangements of the standing and running ropes on both sides of Figure 4 may be modified to the arrangement of the standing and running ropes illustrated in Figure 2.

We claim:

1. Scraper haulage mechanism comprising in combination two tail blocks spaced apart on one side of the area to be treated, an adjustable block situated between them, a scraper device, a haulage rope therefor passing from one side of the scraper and over the adjustable block to one tail block, a standing rope for adjusting the position of the adjustable block in a direction transverse to that of scraping secured to one side of the adjustable block and passing to the other tail block, one of said ropes passing also through the adjustable block to the opposite tail block from that to which it has passed as aforesaid to hold the adjustable block against movement towards the scraper, and winding means for each of said haulage and standing ropes and for any further rope passing to the other side of the scraper.

2. Scraper haulage mechanism comprising in combination two tail blocks spaced apart on one side of the area to be treated, an adjustable block situated between them, a scraper device, a unit winding device, a first haulage rope passing therefrom to one side of the scraper, a second haulage rope passing from the other side of the scraper and over the adjustable block and one tail block to the unit winding device, and a standing rope for adjusting the position of the adjustable block in a direction transverse to that of scraping which is secured to one side of the adjustable block and passes to the other tail block and which is actuated from a component of the said unit winding device, one of said ropes other than the first haulage rope passing also through the adjustable block to the opposite tail block from that to which it has passed as aforesaid to hold the adjustable block against movement towards the scraper.

3. Scraper haulage mechanism comprising in combination three tail blocks anchored respectively at the corner between two adjacent boundaries of an area to be treated and at the outer ends of the said boundaries, an adjustable block situated between two tail blocks at opposite ends of one boundary, a winding device substantially in line with the other boundary, a scraper device, a first haulage rope passing from the winding device to a first tail block at the outer end of the last-mentioned boundary and passing to one side of the scraper, a second haulage rope and a standing rope for adjusting the position of the adjustable block in a direction transverse to that of scraping each passing from components of the winding device to a second tail block situated at the corner between the boundaries and thence to the adjustable block, one of which second haulage and standing ropes also passes through the adjustable block to hold it against movement towards the scraper and subsequently round the third tail block to the adjustable block again to one side of which the said standing rope is secured whilst the second haulage rope is secured to that side of the scraper opposite to that at which the first haulage rope is secured.

4. Scraper haulage mechanism according to claim 3 in combination with a fourth tail block serving as a guide block for the first haulage rope, which passes to that side of the scraper remote from the adjustable block, at a position between the first tail block and the scraper.

5. Scraper haulage mechanism according to claim 3 in combination with a fourth tail block adjustable at will as to the position of its anchorage and serving as a guide block for the first haulage rope, which passes to that side of the scraper remote from the adjustable block, at a position between the first tail block and the scraper.

6. Scraper haulage mechanism comprising in combination four tail blocks anchored at four corners of an area to be treated, a pair of adjustable blocks situated one on each of two opposite sides of the said area, winding means in line with a third side of the said area, a scraper device, a pair of haulage ropes respectively passing from opposite sides of the scraper device each over an adjustable block, and a pair of standing ropes for adjusting the position of the adjustable blocks in a direction transverse to that of scraping, each secured to one side of an adjustable block, one of which haulage or standing ropes on each of the transverse sides of the area to be treated then passes over one tail block and then through the adjustable block to hold it against movement towards the scraper and subsequently over a further tail block to the winding means whilst the other rope on each side of the said area passes from the adjustable block over the further tail block to the winding means.

7. Scraper haulage mechanism comprising in combination three tail blocks anchored respectively at the corner between two adjacent boundaries of an area to be treated and at the outer ends of the said boundaries, an adjustable block situated between two tail blocks at opposite ends of one boundary, a winding device substantially in line with the other boundary, a scraper device, a first haulage rope passing from the winding device to a first tail block at the outer end of the last-mentioned boundary and passing to one side of the scraper, a second haulage rope passing from the winding device to a second tail block situated at the corner between the boundaries and passing through the adjustable block to hold it against movement towards the scraper and round the third tail block to the adjustable block again over which the said second haulage rope passes to the other side of the scraper, and a standing rope for adjusting the position of the adjustable block in a direction transverse to that of scraping passing from a component of the winding device to the second tail block aforesaid and to the adjustable block to which the standing rope is secured.

8. A scraper haulage mechanism comprising in combination two tail blocks spaced apart on one side of the area to be treated, an adjustable block situated between them, a scraper device, a haulage rope therefor passing from one side of the scraper and over the adjustable block and a tail block, a standing rope for adjusting the position of the adjustable block in a direction transverse to that of scraping secured to one side of the adjustable block and passing first over the second tail block and subsequently through the adjustable block and over the first mentioned tail block to hold the adjustable block against movement towards the scraper, a haulage rope passing to the other side of the scraper, and a unit winding device for said haulage ropes and said standing rope comprising at least three drums two of which serve to actuate the haulage ropes and the third serves to actuate the standing rope and all of which drums are power-actuated.

9. A scraper haulage mechanism comprising in combination two tail blocks spaced apart on one side of the area to be treated, an adjustable block situated between them, a scraper device, a haulage rope therefor passing from one side of the scraper and over the adjustable block to one tail block and subsequently passing through the adjustable block and over the other tail block to hold the adjustable block against movement towards the scraper, a standing rope for adjusting the position of the adjustable block in a direction transverse to that of scraping secured to one side of the adjustable block and passing over a tail block, a haulage rope passing to the other side of the scraper, and winding means for said haulage ropes and said standing rope comprising at least three drums two of which serve to actuate the haulage ropes and the third serves to actuate the standing rope and all of which drums are power-actuated.

10. Scraper haulage mechanism comprising in combination four tail blocks anchored at four corners of an area to be treated, a pair of adjustable blocks situated one on each of two opposite sides of the said area, winding means in line with a third side of the said area, a scraper device, a pair of haulage ropes respectively passing from opposite sides of the scraper device each over an adjustable block and over one tail block, then through the adjustable block to hold it against movement towards the scraper and subsequently over a further tail block to the winding means, and a pair of standing ropes for adjusting the position of the adjustable blocks in a direction transverse to that of scraping, each secured to one side of an adjustable block and passing over the aforesaid further tail block to the winding means.

JOHN LEONARD HOLMAN.
ARTHUR TREVE HOLMAN.